UNITED STATES PATENT OFFICE.

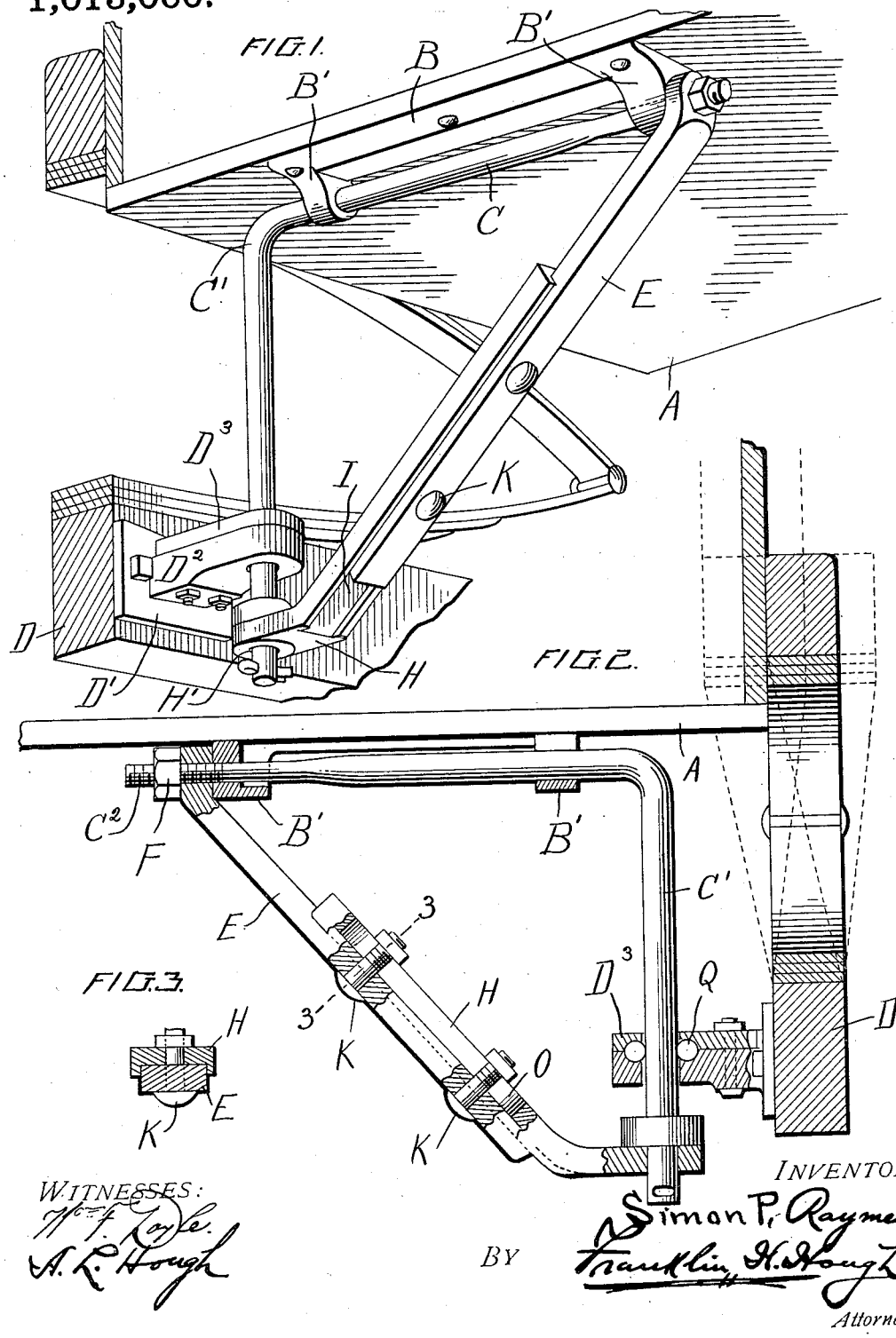

SIMON P. RAYMER, OF MYERSVILLE, MARYLAND.

EQUALIZER FOR CARRIAGES.

1,013,060.  Specification of Letters Patent.  Patented Dec. 26, 1911.

Application filed October 4, 1911. Serial No. 652,804.

*To all whom it may concern:*

Be it known that I, SIMON P. RAYMER, a citizen of the United States, residing at Myersville, in the county of Frederick and State of Maryland, have invented certain new and useful Improvements in Equalizers for Carriages; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in equalizers for carriages and wagons and consists of a simple and efficient device of this nature which is so arranged that it may be adjustably held to the box and gear of the vehicle.

The invention comprises various details of construction, combinations and arrangements of parts which will be hereinafter fully described, shown in the accompanying drawings and then specifically defined in the appended claims.

My invention is illustrated in the accompanying drawings, in which:—

Figure 1 is a perspective view showing the device as applied to the vehicle box and running gear. Fig. 2 is a vertical sectional view through the box and rear axle, and Fig. 3 is a detail sectional view on line 3—3 of Fig. 1.

Reference now being had to the details of the drawings by letter, A designates the bottom of a wagon to which a plate B is fastened to the under surface thereof, which plate is provided with two lugs B', apertured for the reception of the horizontally disposed portion C of the angle bar C'. Fastened to the rear axle D of the vehicle is a plate D' having an integral lug $D^2$ projecting therefrom and apertured for the reception of the upright portion of the rod C'. A second plate $D^3$ is mounted upon the lug $D^2$ and intermediate the lug and said plate $D^3$ is a raceway for antifriction balls O, as shown in Fig. 2 of the drawings. An adjustable bar E has an apertured end adapted to fit over the end of the horizontally disposed part C of the bar C', and a nut F is mounted upon the threaded end $C^2$ and adapted to hold the upper end of the bar E in place. A second bar H has an aperture H' at its lower end to receive the upright portion of the angle rod C' and one face of said bar H is channeled as at I and receives the bar E which is adjustably held in contact therewith by means of the bolts K, said bar H having elongated slots O for the reception of the bolts K, thus permitting of a relative longitudinal adjustment between the two bars E and H.

The operation of my invention will be readily understood and, by the provision of the adjustable features, it will be noted that the equalizer may be held in different adjusted positions in the event of the vehicle box being in different positions relative to the axle upon which it is mounted, the box and springs being adapted to be held in different positions as indicated by dotted lines in the drawings.

What I claim to be new is:—

1. An equalizer for vehicles comprising, in combination with a box and running gear, a plate fastened to the bottom of the vehicle and provided with apertured lugs, an angled rod mounted in said apertures, plates, each receiving an end of said angled rod and having adjustable connections relative to each other, a plate fastened to the running gear and apertured for the reception of said rod, as set forth.

2. An equalizer for vehicles comprising, in combination with a box and running gear, a plate fastened to the bottom of the vehicle and provided with apertured lugs, an angled rod mounted in said apertures and having a threaded end, a plate fastened to the axle and apertured for the reception of the upright portion of the angle rod, bars, each having an aperture adjacent to its outer end and each receiving an end of said angle rod, said bars having relative adjustments, and a nut upon the threaded end of the rod, as set forth.

3. An equalizer for vehicles comprising, in combination with a box and running gear, a plate fastened to the bottom of the vehicle and provided with apertured lugs, an angled rod mounted in said apertures and having a threaded end, a plate fastened to the axle and apertured for the reception of the upright portion of the angle rod, bars, each having an aperture adjacent to its outer end and each receiving an end of said angle rod, said bars having relative adjustments, the outer face of one of said bars being channeled to receive the other bar, bolts passing through apertures in one bar and the slots in the other, and nuts upon the bolts, as set forth.

In testimony whereof I hereunto affix my signature in the presence of two witnesses.

SIMON P. RAYMER.

Witnesses:
CHARLES C. MOSER,
LUTHER C. FLOOK.

Copies of this patent may be obtained for five cents each, by addressing the "Commissioner of Patents, Washington, D. C."